United States Patent Office 3,206,444
Patented Sept. 14, 1965

3,206,444
PROCESS FOR PREPARING HALOGENATED AND SULFOHALOGENATED COPOLYMERS OF LOWER OLEFINS
Albert Gustav Martin Gumboldt, Frankfurt am Main, Erich Heitzer, Hofheim, Taunus, and Karl Gustav Kurt Rust, Erhard Wilhelm Grams, Ludwig Orthner, and Horst Herzberg, Frankfurt am Main, Germany, assignors to Farbwerke Hoechst Aktiengesellschaft vormals Meister Lucius & Brüning, Frankfurt am Main, Germany, a corporation of Germany
No Drawing. Filed Apr. 26, 1961, Ser. No. 105,564
Claims priority, application Germany, Feb. 8, 1956
7 Claims. (Cl. 260—79.3)

This invention relates to a process for preparing halogenated and sulfohalogenated copolymers of lower olefins and is a continuation-in-part application of U.S. patent application Serial No. 638,197, filed February 5, 1957, now abandoned. After having found polymerization processes for ethylene under high pressures, cf. British patent specification No. 471,590, Fawcett et al. (henceforth called high-pressure process), also the halogenation and sulfochlorination products of solid polyethylene of high molecular weight have been used in industry. The halogenation or sulfochlorination of the polymer takes place at normal pressure or under pressure in solvents or dispersing agents which do not react with halogen or $SO_2$ under the conditions of the reaction, such as carbon tetrachloride, chloroform, glacial acetic acid or mixtures thereof. The halogenation and sulfochlorination can be performed within a wide range of temperature. Furthermore when performing the halogenation and sulfochlorination, it is suitable to apply all known steps rendering possible or facilitating the introduction of halogen atoms or $SO_2Cl$ groups into organic molecules. Thus it is possible to work with the irradiation of light of short wave length, or to use organic or inorganic peroxides as catalysts. All these processes relate to polymers obtained according to the high-pressure process.

In the case of products obtained according to the high-pressure process, in addition to relatively small variations of the molecular weight which may be obtained by the polymerization process, the properties of the halogenated or sulfochlorinated products can only be changed by the degree of halogenation or sulfochlorination. When polyethylene is chlorinated, for example, products having tough to brittle character are obtained. Similar products are obtained with the sulfochlorination.

Now we have found that halogen-, preferably chlorine- or simultaneously halogen- and sulfur-containing, preferably chlorine- and sulfur-containing macromolecules of α-olefins containing 2–8 carbon atoms can be prepared by halogenating, preferably chlorinating, and/or sulfohalogenating, preferably sulfochlorinating, in known manner copolymers of at least two terminally unsaturated olefins containing 2–8 carbon atoms, in which copolymers one of the α-olefins is present in an amount of at least 65 mol percent. In a copolymer of two α-olefins, for example ethylene and propylene, the molar ratio of the α-olefins may vary, for example, between 65:35 and 95:5.

It has become possible to produce said copolymers to be subjected to halogenation and/or sulfohalogenation by copolymerizing at least two α-olefins containing 2–8 carbon atoms such as ethylene, propylene, butylene, pentene, hexene or vinylcyclohexene by means of metalorganic catalysts—so-called Ziegler catalysts—obtained by reaction between compounds of a metal of the subgroups IVb–VIb of the periodic table according to Mendeleeff including compounds, especially halogen salts of titanium, vanadium, chromium, zirconium, niobium, molybdenum, hafnium, tantalum and tungsten with aluminum alkyls or aluminum halogenalkyls or beryllium alkyls according to Belgian Patents 533,362, 534,792, 534,788, 540,459, 538,782, and according to Belgian Patents 583,039 and 583,040 to Hercules Powder Company, U.S.A. As suitable salts of a metal of subgroups IVb–VIb of the Periodic Table according to Mendeleeff there may be mentioned for example: $TiCl_4$, $TiCl_3$, $TiBr_4$, $VOCl_4$, $VOCl_3$, $VCl_3$, $VCl_2$, $CrCl_3$, $CrBr_3$, $ZrI_4$, $ZrCl_4$, $MoCl_2$, $MoCl_3$, $MoCl_5$, $HfCl_2$, $TaCl_2$, $WoCl_6$, $CrAc_3$, $TiAc_3$ (in the last two formulae the symbol Ac stands for an acetylacetonyl radical), $VO(OR)_4$, $VOCl_2(OR)$ (in the last two formulae the symbol R stands for an alkyl radical with two to six carbon atoms), $VCl_4.2$ Thf (the symbol Thf stands for tetrahydrofurane), $VCl_4.2$ Pyr (the symbol Pyr stands for pyridine) and $Cp_2TiCl_2$ (the symbol Cp stands for a cyclopentadienyl radical); from among the series of salts mentioned by way of example there are especially suitable the chlorides. As suitable organo-aluminum compounds there may be mentioned by way of example: aluminum-trialkyls, aluminum-dialkyl mono-halides or aluminum-monoalkyl dihalides, such as $Al(C_2H_5)_3$, $Al(n-C_4H_9)_3$, $AlCl(C_2H_5)_2$ and $AlCl_2(C_2H_5)$.

These copolymers obtained by means of said metalorganic catalysts in a polymerization process—so-called low pressure process, because these metalorganic catalysts posses high polymerization activity even at atmospheric pressure—show significant differences in their morphology, e.g. crystallinity and solubility in organic solvents. These copolymers are, for convenience, referred to as "low pressure" copolymers, because they are prepared at lower pressures than the conventional high pressure polyethylene. Thus, the pressure need never exceed 100 atmospheres gage and may go as low as atmospheric pressure. By contrast, high pressure polyethylene is usually prepared under pressures of at least 1000 atmospheres.

It is possible to obtain two modifications of copolymers by variation of the catalyst system or also by variation of the ratio of monomers. One of these modifications shows a high grade of crystallinity (X-rays), a stereo-regular structure and insolubility in organic solvents, the other is completely or substantially amorphous and posseses good solubility in organic solvents. These two modifications of the polymers often are formed together in one polymerization process; in this case, they are separated from each other by extraction, for example with boiling ethers, acetone or n-heptane, in which the amorphous modifications are soluble while the crystalline modifications are not.

This scope of possibilities in variation of properties of the copolymers opens a wide scale of products for the halogenation and/or sulfohalogenation process.

The halogenation, preferably the chlorination, or sulfohalogenation, preferably the sulfochlorination, of the aforementioned copolymers can be carried out in air, for example according to a rotating layer process or it is possible to operate in aqueous dispersing agents.

Of course the reactions mentioned above can also be carried out in a manner such that $CCl_4$, $CHCl_3$, $CH_2Cl_2$ or $C_2Cl_4$ are used as dispersing agents and solvents, i.e. substances which are not affected in the above-mentioned reactions. By the steps according to the present invention products are obtained having outstanding and surprising properties.

Such examples of products having new properties may be found for chlorinated as well as for chlorinated and sulfochlorinated low-pressure copolymers. The expert will make use of the great number of possibilities which, on one hand, consist in combining appropriate monomers such as propylene, butylene, pentene, hexene, vinylcyclohexene in order to form copolymers, on the other hand in varying the degree of chlorination and sulfochlorination, whereby for example a degree of chlorination between 2 and 70% proves to be favorable, to obtain products having technological properties while such products cannot be derived from homopolymers of the aforementioned olefins.

When the products are to be used as raw materials for lacquers a degree of chlorination between 60 and 70% is advantageous. When the products are to be used as raw materials for foils, chlorine contents of 40–50% are chosen, and when they are to be used as caoutchouc-like masses a chlorine content up to 30% is suitable. If it is intended to obtain products which can be converted into an insoluble state by vulcanization, i.e. three-dimensional cross-linking of the linear macromolecules of the polymer, additionally to chlorine atoms, $SO_2Cl$ groups are introduced into the polymer molecule. The chlorination reaction runs parallel to the sulfochlorination reaction and by varying the ratio of $SO_2/Cl_2$ it is possible to regulate the desired chlorine and sulfur content in the polymer. Thus it is advantageous to use for the cross-linking reaction products containing 10–40% of chlorine and 1–10% of sulfur, preferably 20–30% of chlorine and 1–5% of sulfur.

By three-dimensional cross-linking (vulcanization) of the products obtained according to our invention, for example, of a sulfochlorinated product of a copolymer consisting of 90 parts by weight of ethylene and 10 parts by weight of propylene, with the air of polyfunctional compounds, for example tri-basic lead maleate, diamines, polyhydric alcohols or oxides of bivalent metals, such as magnesium or lead oxide or calcium oxide, products are obtained which have considerably improved resilience as compared with vulcanization products of chlorinated or sulfochlorinated polyethylene of the same degree of chlorination and sulfochlorination. This result is new and surprising, since the chlorination and sulfochlorination products of straight chain low-pressure polyethylene or of straight chain low-pressure polypropylene or of branched chain high-pressure polyethylene, do not possess such good properties. This is evident from the following table wherein the sulfochlorinated amorphous modification ($\eta$ spec./c. of the amorphous modification=0.9; chlorine content and sulfur content of the sulfochlorinated amorphous modification 7.2% and 1.5%, respectively) which was obtained by extracting with boiling n-heptane a copolymer produce from 90 parts by weight of ethylene and 10 parts by weight of propylene by polymerizing as described in Example 22 of Belgian Patent 538,782 with the exception that the content of ethylene was modified, is compared with a corresponding sulfochlorination product of a high-pressure polyethylene which had been produced by the process described in British Patent 471,590 (Fawcett et al.), said sulfochlorination product containing approximately the same quantities of sulfur and chlorine.

The following results were obtained:

| | Content, percent by weight | | Behavior on the roller | Property |
|---|---|---|---|---|
| | Cl | S | | |
| Sulfochlorination product according to our invention. | 7.20 | 1.5 | Very good formation of milled sheet at 20° C. | Rubber-elastic soft rubber-like. |
| Sulfochlorinated high pressure polyethylene. | 7.5 | 1.7 | Formation of milled sheet only at 140° C. with splitting off of $SO_2$. | Horn-like not rubber-elastic. |

100 parts by weight of the above-mentioned sulfochlorinated copolymer of ethylene and propylene and the sulfochlorinated high pressure polyethylene, respectively, were mixed on a roller with 40 parts by weight of litharge
3 parts by weight of stearic acid
2 parts by weight of 2-mercaptobenzothiazole until a homogeneous mixture was obtained, and then vulcanized 30 minutes at a temperature of 155° C. The vulcanizates possessed the resilience indicated in the following table.

Resilience in percent

Sulfochlorinated copolymer _____ 46
Sulfochlorinated high pressure polyethylene ___ Below 10

The superiority in technical properties of a sulfochlorination product obtained according to our invention from an amorphous modification ($\eta$ spec./c.=1.0) of a copolymer obtained as described above (Example 22 of Belgian Patent 538,782, modified in ethylene content) from 88 parts by weight of ethylene and 12 parts by weight of propylene, over sulfochlorinated high pressure polyethylene can be seen from a comparison of the vulcanizates.

Composition of the mixtures subjected to vulcanization:

Percent by weight
Litharge _____ 21
Stearic acid _____ 7
2-mercaptobenzothiazole _____ 1
Sulfochlorinated polymer _____ 71

The vulcanizates possessed the properties indicated in the following table. For comparison, the properties of a commercial caoutchouc vulcanizate are also indicated.

| | Content percent by weight in the sulfochlorinated products | | Tensile strength, kg./cm.$^2$ | Elongation percent | Permanent extension percent | Resilience, percent |
|---|---|---|---|---|---|---|
| | Cl | S | | | | |
| Vulcanized sulfochlorinated amorphous copolymer according to our invention | 24 | 3.7 | 102 | 563 | 55 | 36 |
| Vulcanized sulfochlorinated high pressure polyethylene | 25 | 1.9 | 103 | 421 | 75 | 26 |
| Vulcanized caoutchouc | | | 108 | 535 | 38 | 42 |

The above comparison shows that the copolymers which had been sulfochlorinated according to our invention are particularly distinguished over the sulfochlorinated high pressure polyethylenes by their considerably increased resilience.

As compared with vulcanized rubber, the products obtained according to the invention have the great advantage of being resistant to aging and to ozone.

It is known that vulcanizates of sulchlorinated high pressure polyethylene have a lifeless stiff character and lack the warmth and liveliness of the vulcanizates of natural rubber. It was surprising that the vulcanized sulfochloride of the amorphous copylmer was not lifeless but closely resembled vulcanized natural rubber and possessed an increased resilience and a better permanent extension.

The vulcanizates of the sulfochlorides obtained according to our invention from the crystalline modifications of the copolymers also possess a better tensile strength than the vulcanizates of sulfochlorinated high pressure polyethylene as seen from the following tests:

The crystalline modification ($\eta$ spec./c.=1.74) separated by extraction with boiling n-heptane from a copolymer obtained as described above (Example 22 of Belgian Patent 538,782, modified in ethylene content) from 83 parts by weight of ethylene and 17 parts by weight of propylene was sulfochlorinated to yield a product having a chlorine content of 27% and a sulfur content of 1.6%. After being vulcanized as indicated above, the product possessed the following values:

Tensile strength _____kg./cm.$^2$__ 132
Elongation _____percent___ 590
Permanent extension _____do____ 90
Resilience _____do____ 27

The crystalline modification ($\eta$ spec./c.=1.43) of a copolymer obtained as described above (Example 22 of Belgian Patent 538,782, modified in ethylene content) from 88 parts by weight of ethylene and 12 parts by weight of propylene was sulfochlorinated to yield a product having a chlorine content of 26.7% and a sulfur content of 0.8%. After being vulcanized as indicated above, the product possessed the following values:

Tensile strength _____kg./cm.$^2$__ 115
Elongation _____percent___ 840
Permanent extension _____do____ 100
Resilience _____do____ 28

As compared with the vulcanized natural rubber for which similar data were established, the products obtained by the sulfochlorination of copolymers according to our invention and vulcanized with litharge have the advantage of being completely resistant to ozone and highly resistant to concentrated mineral acids, such as nitric acid and sulfuric acid.

The following table shows the differences in the properties of chlorinated high pressure polyethylenes and a chlorination product obtained according to our invention from an amorphous modification of a copolymer obtained according to Belgian Patent 538,782 from 90 parts by weight of ethylene and 10 parts by weight of propylene.

An important difference between the chlorinated copolymers and the chlorinated high pressure polyethylenes was observed when the strength of products containing more than 40% of chlorine was compared.

For example, a chlorinated high pressure polyethylene containing 51% of chlorine has a tensile strength of 130 kg./cm.$^2$, whereas an amorphous modification containing 51% of chlorine ($\eta$ spec./c. of the amorphous modification=0.7) of a copolymer obtained according to Belgian Patent 538,782 from 90 parts by weight of ethylene and 10 parts by weight of propylene has a tensile strength of 470 kg./cm.$^2$.

This result is of extraordinary high technical importance. For example, soft PVC has conquered uncontested fields of application for many industrial uses, in electrical engineering, in the packing industries etc. In many cases, however, the plasticizer was found to be inconvenient (for example, in the food industry).

Packaging sheets of chlorinated polyethylenes (having chlorine contents that correspond to soft PVC) possess properties resembling soft PVC and have, moreover, the advantages that they contain no plasticizer, said plasticizer being liable to migration. However, in spite thereof, it has not been possible up to now to use chlorinated high-pressure polyethylenes successfully for this purpose, because the mechanical properties, especially the strength, leave much to be desired.

Now it has been unexpectedly found that the mechanical properties of the chlorinated copolymers according to the invention are especially favorable in the chlorine ranges in which the high polymer possesses properties similar to those of the soft PVC, thus imparting properties to the material that could not be foreseen.

A further advantage for the use of low-pressure olefin copolymers is based on the fact that the products can often be prepared in 2 modifications (for example, according to the indications of Natta, J. Polymer 16 (1955) 143) in a crystalline and in an amorphous modification. The amorphous products are more readily soluble than the crystalline products. The properties of the chlorination and sulfochlorination products, for example their solubility in organic solvents, are largely influenced by the crystalline or the amorphous character of the starting material.

The following examples serve to illustrate the invention but they are not intended to limit it thereto, the parts and percentages being by weight. All $\eta$ spec./c. values cited in the following examples were measured in a solution of 0.5 percent strength of the copolymer in tetrahydronaphthalene at 130° C.

*Example 1*

200 parts of the readily soluble modification of a copolymer of ethylene-propylene in the ratio of 90:10, $\eta$ spec./c.=1.0 (determined at 130° C. as a solution of 0.5% strength in tetrahydronaphthalene) are dissolved in 2000 parts of carbon tetrachloride. Into the gently boiling solution are introduced, with the radiation of the light of a Heraeus mercury vapor immersion lamp, chlorine and sulfur dioxide in a ratio 1:3. The chlorination and sulfochlorination degree is checked by a continuous sampling. The reaction is interrupted at a degree of chlorination of 7.16% and a sulfur content of 1.5%, the major part of the solvent is eliminated and the residue is kneaded with methanol and dried under reduced pressure. The product cross-linked with lead oxide has a resilience of 46%.

*Example 2*

Under the conditions as indicated in Example 1 the chlorination and sulfochlorination of the same copolymer is brought to a degree of chlorination of 23.6% and a sulfur content of 3.7%. The resilience of the product cross-linked on the roller with lead oxide amounts to 36%, the resilience of a polyethylene containing the same amounts of chlorine and sulfur amounts to 22%.

*Example 3*

150 parts of the more difficultly soluble modification of a copolymer of ethylene and propylene in a ratio of

| Chlorine content | 10% | 30% | 45% | 51% | 67% |
|---|---|---|---|---|---|
| Chlorinated high pressure polyethylene. | Horn-like | Soft rubber-like | Resembling soft polyvinylchloride | Gutta percha-like | Resin-like, brittle. |
| Chlorinated copolymer (90% of ethylene/10% of propylene). | Soft rubber-like self-adhesive. | Soft rubber-like self-adhesive. | As indicated above, but having a substantially higher tensile strength. | | Elastic hard films. |

90:10, $\eta$ spec./c.=3 are dissolved in 5000 parts of tetrachlorethane at a temperature of 105–110° C. and attacked with 2 grams of gaseous chlorine per minute. After 180 minutes the reaction product has a chlorine content of 21.4%.

Example 4

A chlorination product prepared according to Example 3 is attacked with chlorine and sulfur dioxide in a ratio of 1:1 at 40° C. with the radiation of ultra-violet light. The reaction is interrupted at a chlorine content of 26% and a sulfur content of 1.6% and the rubber-elastic product is isolated by precipitating it with methanol and eliminating the adhering residues of the solvent by rolling.

Example 5

50 parts of the more difficultly soluble modification of a copolymer of ethylene and propylene in a ratio of 88:12, ($\eta$ spec./c.=3.1) are dissolved in 1500 parts of tetrachlorethane and attached with 1.5 g. of chlorine per minute, first for 2 hours at 110° C. and then for 3 hours at 80° C. By pressing the mixture into hot water the chlorination product is isolated in the form of flakes containing 61.1% of chlorine.

Example 6

100 parts of the more difficultly soluble modification of a copolymer of ethylene and propylene in a ratio of 90:10 ($\eta$ spec./c.=3.0) (determined as a solution of 0.5% strength in tetrahydronaphthalene at 130° C.) are suspended in 1000 parts of distilled water and attacked with chlorine while vigorously stirring at 40–60° C. The reaction vessel is exposed to ultra-violet light. The progress of the reaction is pursued by titration. After 2 hours the reaction product contains 31% of chlorine.

The white powdery product is suction-filtered, washed with water until the wash water is free from chlorine and then dried at 70° C.

Example 7

400 parts of a partially crystalline ethylene/propylene copolymer, prepared with TiCl$_4$+Al(C$_2$H$_5$)$_3$ as polymerization catalyst, were dissolved at 100° C. in 6400 parts of tetrachlorethane, said copolymer containing as structural units 72 mol percent of ethylene and 28 mol percent of propylene and having the viscosity $\eta$ spec./c.=1.3. Then 250 parts of chlorine were passed in at 110° C. in the course of 4 hours. The reaction mixture was cooled to 60° C. and chlorine was again introduced at the rate of 60 parts/hour and sulfur dioxide at the rate of 35 parts/hour for 3 hours with the irradiation of ultra-violet light. Prior to precipitating the sulfochlorinated copolymer with 7000 parts by volume of methanol, the reaction vessel was scavenged with nitrogen. The sulfochlorinated copolymer contained 1.15 percent of sulfur and 28.9 percent of chlorine.

When introducing only half the amount of sulfur dioxide while proceeding otherwise in the same manner as stated above, a sulfochlorinated copolymer was obtained containing 0.57 percent of sulfur and 28.9 percent of chlorine.

Example 8

200 parts of the readily soluble amorphous modification of an ethylene/propylene copolymer containing 30 mol percent of ethylene and 70 mol percent of propylene and having the viscosity $\eta$ spec./c.=1.8, prepared with VOCl$_3$+Al(C$_4$H$_9$)$_3$, were dissolved in 4000 parts of carbon tetrachloride at 60° C. Into this solution there were passed in, with the irradiation of ultra-violet light, at 60° C., first 120 parts of chlorine for four hours and, for another two hours, 35 parts of sulfur dioxide and 50 parts of chlorine. After scavenging the reaction vessel with nitrogen, the sulfochlorinated copolymer was precipitated with 4000 parts by volume of methanol, said copolymer having a sulfur content of 0.95 percent and a chlorine content of 26.5 percent.

Example 9

200 parts of a partially crystalline ethylene/propylene copolymer (molar ratio ethylene:propylene=95:5) having the viscosity $\eta$ spec./c.=1.8, which had been obtained by polymerizing ethylene and propylene with a Ziegler catalyst system consisting of TiBr$_4$ and AlBr(C$_2$H$_5$)$_2$ were dissolved in 3200 parts of tetrachlorethane at 110° C. to 115° C. At this temperature, 35 parts of chlorine were passed in for one hour; the reaction mixture was cooled to 50° C. and 20 parts of sulfur dioxide and 150 parts of chlorine were introduced in the course of three hours while irradiating the reaction mixture with ultraviolet light. After scavenging the reaction vessel with nitrogen, the sulfochlorinated copolymer was precipitated with methanol and dried in the vacuum drying oven at 50° C. to 60° C. The sulfochlorinated copolymer contained 1.05 percent of sulfur and 27.7 percent of chlorine. Yield: 270 parts.

Instead of the ethylene/propylene copolymer there may also be used a copolymer of ethylene/butylene (molar ratio ethylene:butylene-(1)=92:8) having the viscosity $\eta$ spec./c.=2.4, prepared with the aforesaid catalyst system. If, instead of the amount of chlorine mentioned in the preceding paragraph, double the amount of chlorine was allowed to react with the copolymer, a product was obtained containing 0.8 percent of sulfur and 41.5 percent of chlorine.

Example 10

200 parts of a readily soluble ethylene/propylene copolymer (molar ratio ethylene:propylene=80:20) having the viscosity $\eta$ spec./c.=1.1, which was obtained by polymerizing ethylene and propylene with a Ziegler catalyst system consisting of TiCl$_3$ and AlCl$_2$(C$_4$H$_9$), were dissolved in 3500 parts of carbon tetrachloride at 70° C. Into this solution there were introduced in the course of four hours 30 parts of sulfur dioxide and 110 parts of chlorine while simultaneously dropping in a solution of 0.1 percent strength of triacetone peroxide dissolved in carbon tetrachloride, during which procedure the temperature was slowly decreased to 55° C. to 60° C. After scavenging the reaction vessel with nitrogen, the sulfochlorinated copolymer was precipitated by the addition of 3000 parts by volume of methanol and dried in the vacuum drying oven at 50° C. to 60° C. The reaction product contained 1.5 percent of sulfur and 18.2 percent of chlorine. Yield: 245 parts.

The sulfochlorinated copolymer thus obtained was then vulcanized at 150° C. for 20 minutes, for example with magnesium oxide, according to the following recipe:

100 parts of sulfochlorinated copolymer
3 parts of stearic acid
20 parts of magnesium oxide
1 part of dipentamethylene thiruram tetrasulfide The vulcanizate then had a resilience of 45 percent. Prior to the vulcanization, fillers such, for example, as carbon black or pigments, for example, titanium dioxide, may still be added to the sulfochlorinated copolymer. A vulcanizate having the same good properties is obtained when, instead of magnesium oxide, the same amount of calcium oxide is applied.

Instead of the ethylene/propylene copolymer used, there may also be applied an ethylene/butylene copolymer (molar ratio ethylene:butylene-(1)=80:20) having the viscosity $\eta$ spec./c.=1.7, or an ethylene/propylene/butylene copolymer (molar ratio ethylene/propylene/butylene-(1)=80:16:4) having the viscosity $\eta$ spec./c.=0.95, or an ethylene/pentene-(1) copolymer (molar ratio ethylene:pentene-(1)=90:10) having the viscosity $\eta$ spec./c.=1.3, or an ethylene/hexene-(1) copolymer (molar ratio ethylene:hexene-(1)=90:10) having the viscosity η spec./c.=2.4, or a propylene/butylene/pentene-(1)/hexene-(1) copolymer (molar ratio propylene:butylene-(1):pentene-(1):hexene-(1)=70: 10:10:10 having the viscosity η spec./c.=0.87, or a butylene/pentene-(1) copolymer (molar ratio butylene-(1):pentene-(1)=80:20) having the viscosity η spec./c.= 2.1, said copolymers being prepared with the aforesaid catalyst system.

*Example 11*

100 parts of a readily soluble ethylene/propylene copolymer (molar ratio ethylene:propylene=65:35) having the viscosity η spec./c.=2.1, prepared with a catalyst system of VO(OC$_4$H$_9$ tert.)$_3$ and Al(C$_2$H$_5$)$_2$Cl, were dissolved in 1800 parts of carbon tetrachloride at 70° C. At this temperature, 18 parts of Cl$_2$ were then passed in in the course of 30 minutes. After scavenging with nitrogen, the chlorinated copolymer was precipitated with methanol and dried. The product contained 5.9 percent of chlorine. Yield: 102 parts.

When 36 parts of chlorine were introduced into the above solution in the course of one hour instead of the amount of chlorine as indicated above, the chlorinated copolymer had a chlorine content of 12.7 percent; when 72 parts of chlorine were passed in, the chlorinated copolymer contained 24.2 percent of chlorine; when 220 parts of chlorine were introduced, a chlorinated copolymer was obtained containing 49 percent of chlorine; when 600 parts of chlorine were passed in a product was obtained having a content of 70 percent of chlorine.

Instead of the copolymer as applied above, there can also be used an ethylene/propylene/pentene-(1) copolymer (molar ratio ethylene/propylene/pentene-(1)=87: 11:2) having the viscosity η spec./c.=1.74, or a copolymer of propylene and butene-(1) (molar ratio propylene:butene-(1)=87:13) having the viscosity η spec./c.= 2.8, said copolymers being prepared with the aforesaid catalyst system.

*Example 12*

100 parts of a partially crystalline ethylene/propylene copolymer (molar ratio ethylene:propylene=75:25) having the viscosity η spec./c.=4.5, prepared with a catalyst system of ZrCl$_4$ and Al(C$_2$H$_5$)$_3$, were suspended in 1000 cm.³ of water together with a hydroxyethylated octyl phenol (with 8 glycol ether units). Into this suspension 32 parts of chlorine were introduced within 30 minutes at 25° C. to 40° C. while irradiating the mixture with ultra-violet light. The chlorinated copolymer was suction-filtered, washed with water and dried. The product contained 9.7 percent of chlorine; yield: 108 parts. When 130 parts of chlorine were introduced, a product was obtained containing 27.2 percent of chlorine, or 220 parts of chlorine were passed in and a product was obtained containing 41.2 percent of chlorine, or 440 parts of chlorine were introduced and a chlorinated copolymer was obtained containing 53.7 percent of chlorine.

Instead of said ethylene/propylene copolymer there may likewise be used an ethylene/butylene-(1) copolymer (molar ratio ethylene:butylene-(1)=70:30) having the viscosity η spec./c.=5.2, or an ethylene/hexene-(1) copolymer (molar ratio ethylene:hexene-(1)=95:5) having the viscosity η spec./c.=1.7, or a propylene/butylene-(1) copolymer (molar ratio propylene/butylene-(1)=90:10)

having the viscosity η spec./c.=1.2, or an ethylene/propylene/pentene-(1) copolymer (molar ratio ethylene/propylene/pentene-(1)=75:20:5)

having the viscosity η spec./c.=0.9, said copolymers being prepared with a catalyst system of VCl$_3$ and AlCl(C$_4$H$_9$)$_2$

*Example 13*

250 parts by weight of readily soluble modification of an ethylene/propylene copolymer (74:26 mol percent; reduced specific viscosity η red.=2.4) prepared by copolymerizing ethylene and propylene with VCl$_3$ and Al(C$_2$H$_5$)$_3$ as catalyst, were dissolved at 60° C. in 3500 parts by volume carbon tetrachloride. 10 parts by volume (=31.4 grams) bromine were then added dropwise at 30° C. within 30 minutes while the reaction mixture was irradiated with ultraviolet light. The whole was stirred for a further 15 minutes and nitrogen was introduced into the reaction mixture. The brominated copolymer was precipitated with 4 liters methanol and dried at 50° C. in a vacuum drying cabinet. The resulting copolymer was obtained in a yield of 256 grams. Analysis indicated that the copolymer contained 5.2% bromine.

We claim:
1. A cross-linked sulfochlorinated low pressure ethylene/propylene copolymer, said copolymer having been prepared by the copolymerization of ethylene and propylene in a molar ratio varying between 65:35 and 95:5 in contact with a catalyst comprising an organo-aluminum compound and a salt of a metal of subgroups IVb, Vb and VIb of the Mendeleeff Periodic Table.

2. The product of claim 1 wherein said sulfochlorinated low pressure copolymer has a chlorine content of 5–40% and a sulfur content of 0.5–5%.

3. The product of claim 1 wherein said sulfochlorinated low pressure copolymer has a chlorine content of 15–30% and a sulfur content of 0.5–3%.

4. A cross-linked sulfochlorinated low pressure copolymer which has been cross-linked by a bivalent metal oxide selected from the group consisting of MgO, PbO and CaO, said copolymer having been prepared by the copolymerization of at least two terminally unsaturated monoolefins selected from the group consisting of ethylene, propylene, butylene, pentene, and hexene, one of the monoolefins being present in an amount of at least 65 mol percent and a second monoolefin being present in an amount of at least 5 mol percent, said copolymerization being conducted in contact with a salt of a metal of subgroups IVb, Vb and VIb of the Mendeleeff Periodic Table and an organoaluminum compound as a catalyst.

5. The product of claim 4 wherein said copolymer is prepared from ethylene and propylene.

6. A cross-linked sulfochlorinated low pressure copolymer which has been cross-linked by a bivalent metal oxide selected from the group consisting of MgO, PbO and CaO, said copolymer having a chlorine content of 5–40% and a sulfur content of 0.5–5%, said copolymer having been prepared by the copolymerization of ethylene and propylene in a molar ratio varying between 65:35 and 95:5 in contact with a catalyst comprising an organoaluminum compound and a salt of a metal of subgroups IVb, Vb and VIb of the Mendeleeff Periodic Table.

7. A cross-linked sulfochlorinated low pressure copolymer which has been cross-linked by a bivalent metal oxide selected from the group consisting of MgO, PbO and CaO, said copolymer having a chlorine content of 15–30% and a sulfur content of 0.5–3%, said copolymer having been prepared by the copolymerization of ethylene and propylene in a molar ratio varying between 65:35 and 95:5 in contact with a catalyst comprising an organoaluminum compound and a salt of a metal of subgroups IVb, Vb and VIb of the Mendeleeff Periodic Table.

References Cited by the Examiner

UNITED STATES PATENTS

| | | | |
|---|---|---|---|
| 2,416,060 | 2/47 | McAlevy et al. | 260—94.9 |
| 2,850,490 | 9/58 | Canterino et al. | 260—94.9 |
| 2,852,497 | 9/58 | Thompson | 260—79.3 |
| 2,879,261 | 3/59 | Johnson et al. | 260—79.3 |
| 2,898,326 | 8/59 | Peters et al. | 260—88.2 |
| 2,920,062 | 1/60 | McFarland | 260—88.2 |
| 3,079,218 | 2/63 | Giulio et al. | 260—79.3 |

(Other references on following page)

FOREIGN PATENTS 538,782 12/55 Belgium.
540,362 2/56 Belgium.
861,542 2/61 Great Britain.
563,508 6/57 Italy.

OTHER REFERENCES

Brooks et al.: Chlorosulfonated Polyethylene, article in India Rubber World, March 1953, pages 791 to 793.

Smook et al.: Chlorosulfonated Polyethylene, article in India Rubber World, April 1953, pages 54 to 58.

Smook et al.: Derivatives of Chlorosulfonated Polyethylene, article in Ind. & Eng. Chem., vol. 45, pages 2731 to 2737, December 1953.

WILLIAM H. SHORT, *Primary Examiner.*

MORRIS LIEBMAN, JOSEPH R. LIBERMAN,
*Examiners.*